Feb. 12, 1946. T. L. GOTTIER 2,394,544
RECEIVING SYSTEM FOR ELECTRIC WAVES
Filed Feb. 27, 1943 4 Sheets-Sheet 1
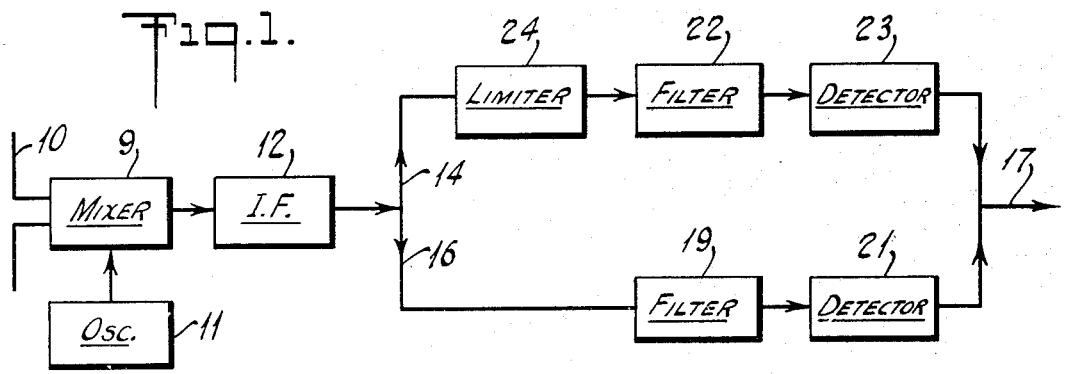
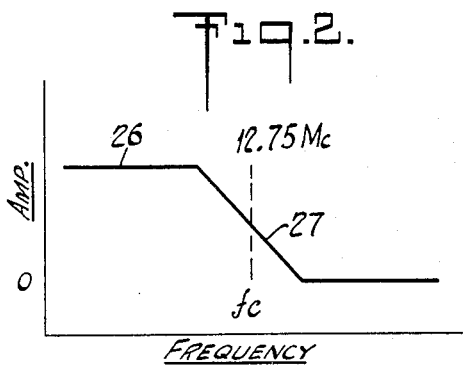
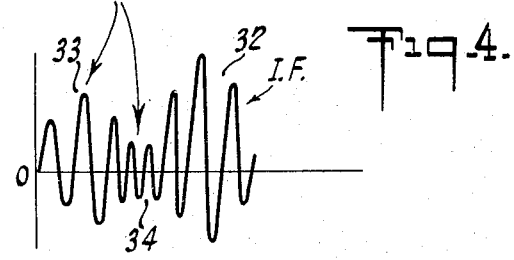
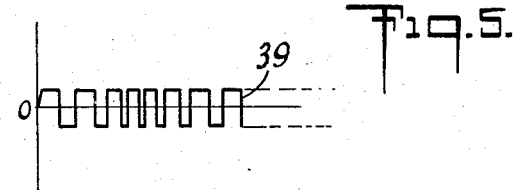
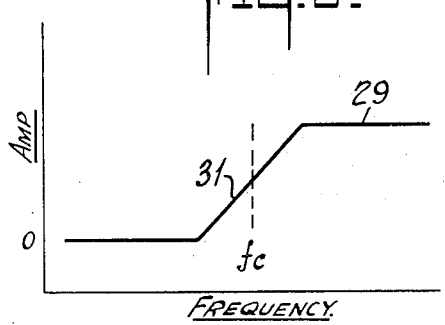
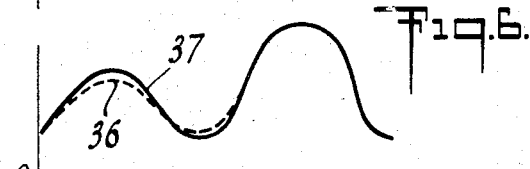
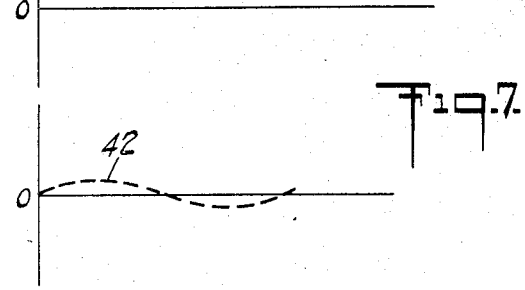
INVENTOR
THOMAS L. GOTTIER
BY
ATTORNEY Feb. 12, 1946.  T. L. GOTTIER  2,394,544
RECEIVING SYSTEM FOR ELECTRIC WAVES
Filed Feb. 27, 1943  4 Sheets-Sheet 2
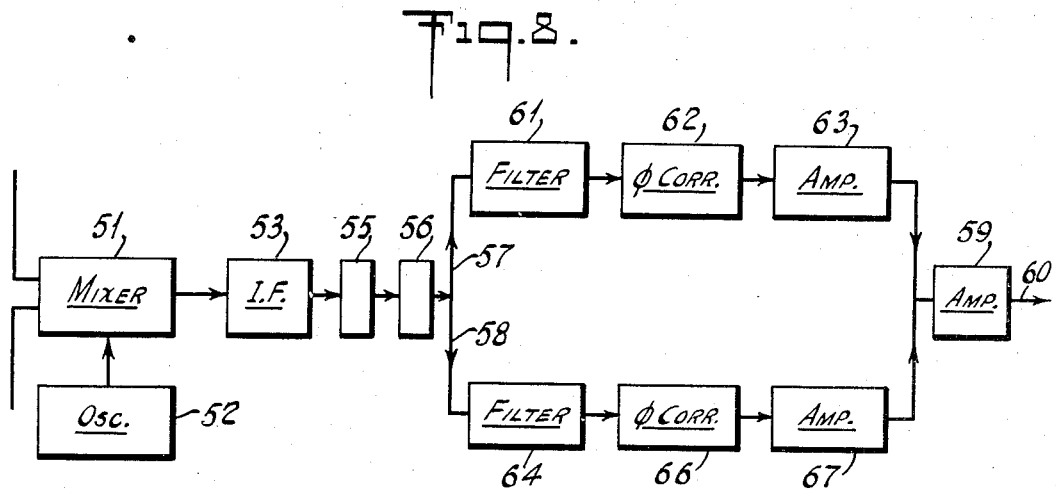
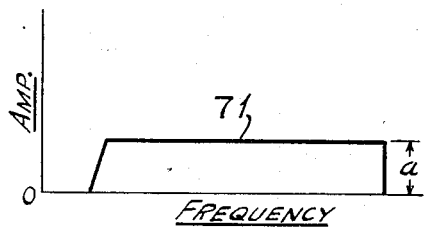
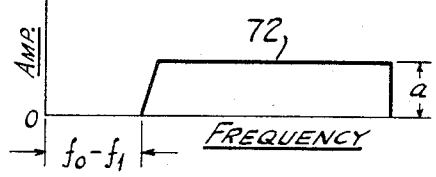
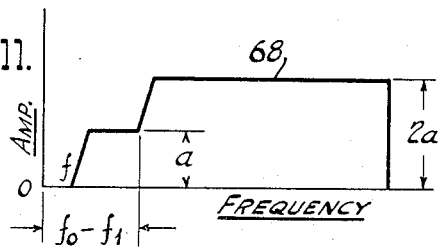
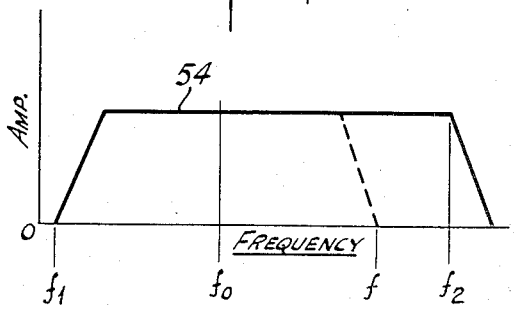
INVENTOR
THOMAS L. GOTTIER.
BY H.S. Grover,
ATTORNEY INVENTOR
*Thomas L. Gottier*

BY *H. S. Snover,*
ATTORNEY

Feb. 12, 1946. T. L. GOTTIER 2,394,544
RECEIVING SYSTEM FOR ELECTRIC WAVES
Filed Feb. 27, 1943 4 Sheets-Sheet 4
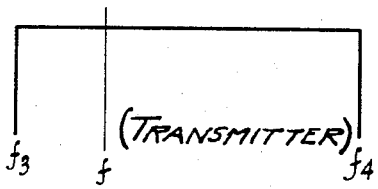
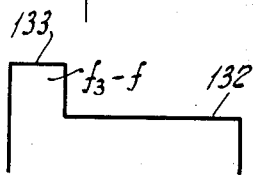
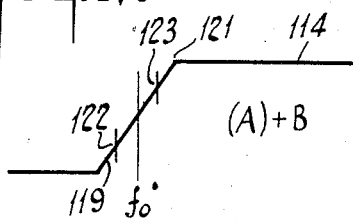
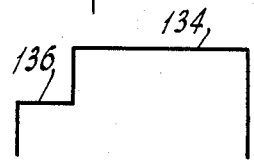
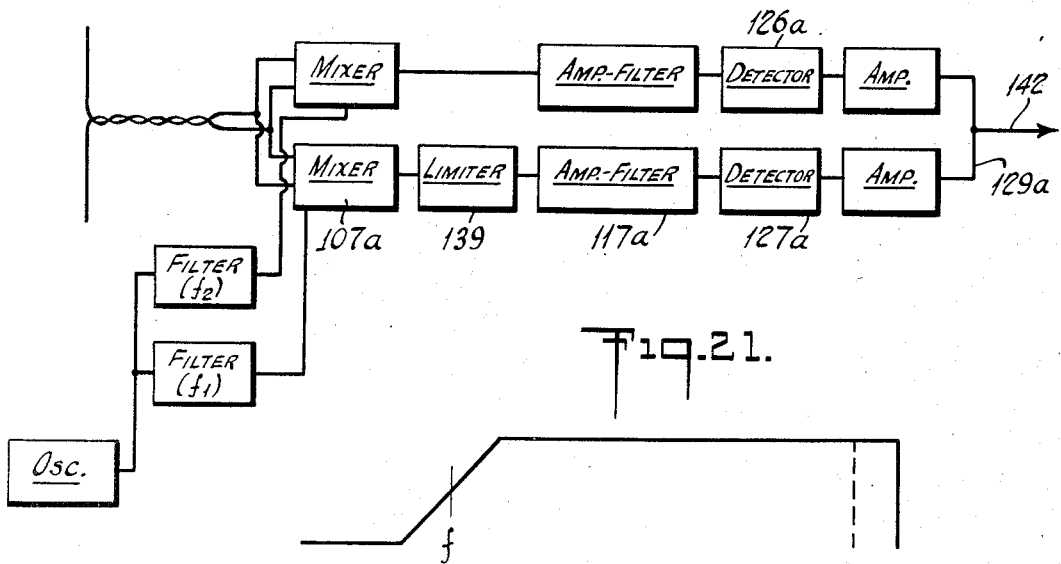
INVENTOR
THOMAS L. GOTTIER.
BY N. S. Grover.
ATTORNEY Patented Feb. 12, 1946

2,394,544

UNITED STATES PATENT OFFICE 2,394,544

RECEIVING SYSTEM FOR ELECTRIC WAVES

Thomas L. Gottier, Princeton, N. J., assignor to Radio Corporation of America, a corporation of Delaware Application February 27, 1943, Serial No. 477,339

4 Claims. (Cl. 250—20)

The present invention relates to the reception of electric waves, and more particularly to the reception, substantially without interference from unwanted noise components, of transmitted modulated waves of which one complete side band and only a portion or substantially a portion of the remaining side band is utilized for the transmission of intelligence.

A system of transmission in which one side band is partially suppressed is employed at the present time for transmitting picture intelligence in television systems. Phase and frequency modulations of the received signals are very often present and appear in the demodulated output of the receiver as interfering signals usually referred to as "noise." In the visual reproduction of transmitted television pictures, these interfering signals cause picture distortions which spoil the appearance of the picture.

The major object of the present invention is to eliminate interfering signals of the kind mentioned above from the demodulated output of radio receiving apparatus.

Another object of the invention is to provide for the elimination of frequency and phase modulation effects in the reproduction of a picture in a television receiver.

Other and more specific objects of the invention will become apparent and suggest themselves to those skilled in the art to which the invention is directed upon reading the following specification and claims in connection with the drawings in which:

Fig. 1 is a schematic block diagram of an electric wave receiver embodying the invention and being suitable for use as a television receiver;

Figs. 2 and 3 are curves of two of the electric wave filters shown on Fig. 1 and identified more particularly hereinafter;

Figs. 4, 5, 6 and 7 show a group of curves which are referred to in explaining the invention;

Fig. 8 is similar to Fig. 1 and shows an electric wave receiver embodying the present invention in modified form;

Figs. 9, 10, 11 and 12 are characteristic curves of different pieces of apparatus shown in Fig. 8 to be identified more particularly hereinafter;

Fig. 16 is a diagram indicating the characteristic of the transmitted television signal;

Figs. 17, 18 and 19 are curves which are used in explaining the invention in the form disclosed by Fig. 15;

Figure 15:
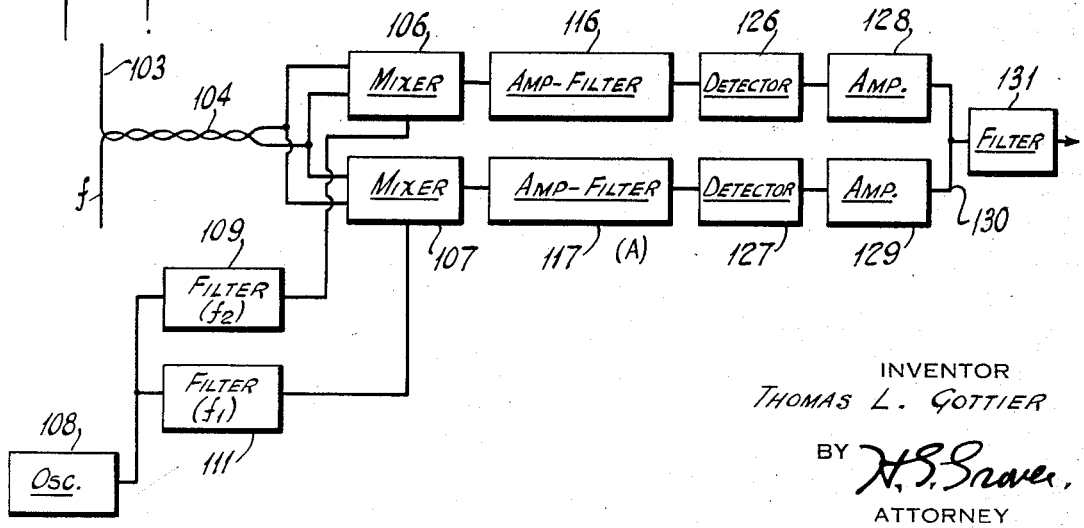
Fig. 15 is similar to Fig. 1 and shows a further modification of the invention.

Fig. 20 discloses a modification of the arrangement shown in Fig. 15, and

Fig. 21 is a diagram indicating the characteristic of a modified form of transmitted television signal.

Referring to Fig. 1, there are shown the principal elements of a television receiver which may be similar in detail to that shown in Fig. 6 of Patent No. 2,300,501 granted to G. L. Grundmann on November 3, 1942. The receiver is of the superheterodyne type, comprising a first detector or mixer stage 9 fed from a communication channel, transmission line or antenna indicated at 10, and the usual tunable oscillator 11. An intermediate frequency amplifier is indicated at 12 and will usually be made up of a series of amplifier stages coupled together in cascade relationship in the well-known manner. The intermediate frequency amplifier 12 may, it will be understood, include rejector circuits for rejecting or attenuating the sound signal, which in most instances accompanies the picture signal.

The output of the intermediate frequency amplifier 12 is divided and is fed through two separate paths or circuits, indicated by reference characters 14 and 16, to the final output connection shown conventionally and indicated by reference character 17. The connection 17, it will be understood, is in communication in the usual manner with a translating device such as picture reproducing apparatus when the receiver of Fig. 1 is used as a television receiver. The usual sound equipment is, or may be employed, but since it forms no part of the present invention it is not shown. Electrical signals representing the sound accompaniment may be prevented from appearing in the output connection 17 in the manner pointed out in the Grundmann patent above referred to.

The path or circuit 16 includes a filter and a demodulator or detector device shown conventionally at 19 and 21 respectively. The circuit or path 14 also includes a filter and detector 22 and 23 respectively. A wave limiting device 24 functioning as an amplitude limiter limits the amplitude of intermediate frequency signals fed to the input circuit of the filter 22 from the intermediate frequency amplifier 12 in the manner shown in Fig. 5.

Fig. 2 of the drawings shows the transmission characteristic or amplitude response curve 26, plotted in terms of amplitude vs. frequency, of the filter 22 in the path 14. The filter has a sloping cut-off characteristic 27 the center or approximate 50% response point of which coincides with the unmodulated intermediate carrier frequency $f_c$ which appears in the output of the intermediate frequency amplifier 12. The value of $f_c$ given as 12.75 megacycles is purely illustrative and has been selected for the sake of convenience in describing the invention. Fig. 3 of the drawings shows the amplitude response curve 29 of the filter 19 in the path 16. The approximate 50% response point of the sloping portion 31 of the cut-off characteristic of this filter also coincides with the unmodulated intermediate carrier frequency $f_c$. While the carrier has been shown as being located at the 50% response point of the filters 19 and 22, it will be understood that the carrier may be located at any point on the slope of either filter provided that the degree of slope at the selected points on both filters is the same.

Fig. 4 of the drawings shows the wave form 32 of a hypothetical intermediate frequency signal used for the purpose of illustrating the operation of the invention embodied in the system of Fig. 1. The reference characters 33 and 34 indicate sections of the modulated carrier which are assumed to be distorted by a phase or frequency shift. The curve 36 of Fig. 6 shows the detected envelope of the output from the filter 19. Curve 37 of Fig. 6 represents the detected envelope which would be obtained if frequency and phase distortions were absent in the intermediate frequency signal 32. The space between the curves 36 and 37, which coincides with the point 33 of Fig. 4, represents a decrease in amplitude of the detected signal because of a decrease in frequency or a lag in phase of the incoming carrier. An increase in amplitude of the envelope 36 is indicated at a point which coincides with the region 32 of the curve in Fig. 4. This increase in amplitude is caused by an increase in frequency or an advance in the phase of the incoming character. It will be understood that the curves of Figs. 4 to 7 are, as stated above, purely illustrative and that these changes may occur at close intervals in point of time and will follow no predetermined or predictable order. The curve 39 of Fig. 5 indicates the output of the limiter 24. This curve is of substantially constant amplitude, but however contains the frequency or phase distortions of the curve 32 of Fig. 4. The curve 42 of Fig. 7 represents the output from the detector 23 which will, of course, have a substantially constant average value except for an increase in amplitude in the region corresponding to the region 33, and a decrease in amplitude in the region corresponding to the region 34 of Fig. 4 because of the effect of the sloping characteristic of the filter 22. The amplitude of the curve 39 will be sufficient to cause amplitude changes in the filter 22 which result in the curve 42. This effect is the reverse of the effect produced by the filter 19. When the curve 42 is added to the curve 36 the resultant is the curve 37, which represents the desired undistorted wave form of the detected signal. The gains in the paths 14 and 16 are preferably adjusted to provide the desired relative amplitude so that the curves 36 and 42 will aid in the equipment shown to produce the curve 37. Also, the delays must be equal through the two filter paths.

Fig. 8 shows a modification of the television receiving system of Fig. 1. The mixer and oscillator 51 and 52 respectively may be the same as the mixer stage 9 and tunable oscillator 11 shown on Fig. 1 of the drawings. The intermediate frequency amplifier 53 has a selective characteristic curve 54 approximately as shown in Fig. 12 of the drawings in which $f_0$ indicates the frequency of the unmodulated carrier and $f_2$ the highest frequency in the intermediate frequency side band, while $f_1$ represents the lowest frequency of the lower intermediate frequency side band which is produced in the intermediate frequency stages of a receiver in present day television transmission practice. The output from the intermediate frequency amplifier 53 is demodulated in the usual manner in a second detector 55 and after amplification in an amplifier 56 is fed through two separate paths or circuits 57 and 58 to an amplifier 59, the output of which is coupled or connected to the final output connection conventionally shown and indicated by reference character 60 corresponding to the output connection 17 in Fig. 1. The circuits or paths 57 and 58 comprise similar equipment. Path 57 is made up of a filter 61, a phase correcting network 62, and an amplifier 63, and the path 58 is made up of a filter 64, a phase correcting network 66 and an amplifier 67. The filters 61 and 64 have a combined characteristic which is illustrated by the curve 68 of Fig. 11. The response characteristic of the individual filters 61 and 64 are shown by the curves 71 and 72 respectively.

In operation of the arrangement shown by Fig. 8 of the drawings the second detector or demodulator 55 detects only the amplitude modulation of the intermediate frequency signal. Distortion caused by frequency modulation is therefore eliminated since additional and an unwanted amplitude modulation is not introduced by operating the system over a sloping amplitude vs. frequency characterisic. Between $f_0$ and $f_2$ on the curve of Fig. 12 no difficulty will be experienced from frequency modulation effects. On the slopes of the characteristic 54, frequency modulation of the incoming signal will affect the output of the second detector. The video characteristic is corrected in the filter combination 61 and 64 so that the amplitudes of all of the video frequencies after detection are equal.

The correction is accomplished by designing the filters so that the combined response characteristic 68 has 50% attenuation for frequencies lying between the carrier frequency and the lowest frequency of the lower side band. The filter 64 has substantially 100% attenuation in the portion of the spectrum shown by the curve 72 of Fig. 10. The amplifiers 63 and 67 provide a simple means for adjusting the gains from the output of the two filters so that result is as shown in Fig. 11. It will be understood that a single filter may be employed having the characteristic shown by the curve 68, but such a filter is difficult to design and the arrangement shown provides a simplification of apparatus.

Figure 13:
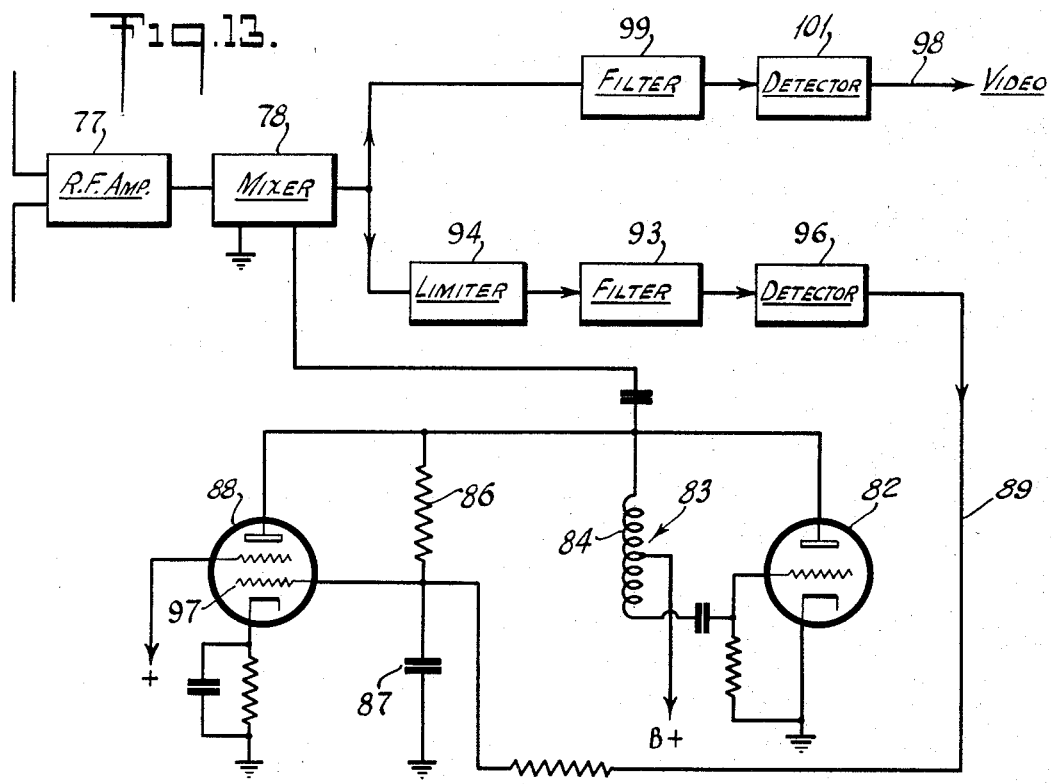
Fig. 13 is similar to Fig. 1 and discloses another modification of the invention.

Fig. 13 illustrates another modification of the invention embodied in a television receiving system in which a radio frequency amplifier 77 feeds a mixer stage 78. An oscillator tube 82 provides the locally generated frequency which is supplied to the mixer 78 wherein correction for distortion due to phase or frequency shifts in the signal carrier is obtained. A tuned circuit or network, in general of the "Hartley" type, is indicated by the reference character 83 and comprises an inductance 84 having two coupled sections and a circuit including a resistor 86 and a condenser 87 which serves to tune the inductance 84. The oscillation frequency may be controlled by a range switch and its associated circuits or an adjustable inductance or capacity (not shown) or it may be changed in any other suitable manner. The resistance 86 has a high value as compared with the capacity of the condenser 87.

A reactance tube 88 provides a fast acting automatic frequency control on the oscillator tube 82. The frequency of the oscillator 82 is shifted by means of the tube 88 so that the unwanted frequency or phase modulation in the received signal, as detected on the slope 91 of the response characteristic 92 of a filter 93, is materially reduced or substantially eliminated.

Figure 14:
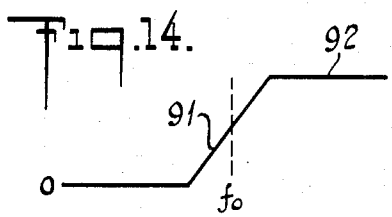
Fig. 14 shows the filtering characteristic of the filters of Fig. 13.

The derivation of the control voltage applied to the reactance tube 88 by way of a conductor 89 may be obtained as shown by taking a portion of the output from the mixer 78 and passing it through a limiter 94 to remove the amplitude modulation. The resulting substantially square topped wave, which contains the unwanted frequency or phase modulation, is applied to the filter 93 previously mentioned which provides substantially 50% response at the intermediate carrier frequency $f_0$ as indicated on Fig. 14. The unwanted changes in phase or frequency appear as amplitude modulations in the output of the filter 93 and are detected in a detector 96 before being applied to the control grid 97 of the reactance tube 88 by way of the conductor 89. The polarity of the signal appearing in the conductor 89 is such that shift of the oscillator frequency produced by the reactance tube limits undesired frequency modulations. The circuits of the reactance tube 88, the oscillator, filter, etc., are preferably broadly tuned so as to keep the delay small and thereby provide fast acting frequency changes of the oscillator 82 to counteract the unwanted phase or frequency shifts of the incoming signal.

The mixer 78 feeds desired signals to the final output connection 98 by way of a filter 99, and a detector 101. If desired, intermediate frequency amplification may be employed between the filter 99 and the detector 101. The characteristic of the filter 99 is like that shown in Fig. 14.

Fig. 15 of the drawings illustrates a further modification of the invention, in which the incoming signal is heterodyned with two frequencies, one above and the other below the signal carrier frequency. The derived carrier frequencies and side bands are passed through separate filters having the same frequency characteristics. Each of these derived carriers is detected and the detector outputs are added. By this procedure the spurious signals due to unwanted frequency modulation are cancelled out and the desired signals due to amplitude modulation will be added.

The manner in which this is accomplished will appear from the following description of Fig. 15, in which a received signal source such as an antenna 103 is connected by a transmission line or the like 104 to separate mixer stages 106 and 107 respectively. A separate oscillator 108 generates waves of several different frequencies in a well known manner and filters 109 and 111 select two of these frequencies, one of which, for example $f_2$ passed by the filter 109, is below that of the incoming signal carrier frequency $f$ and the other $f_1$ passed by the filter 111 is above that of the incoming signal carrier frequency.

Fig. 16 indicates the character of the transmitted television signal which comprises a carrier wave having the frequency $f$, one complete side band such as the upper side band extending to frequency $f_4$ and part of the lower side band which extends to the frequency $f_3$. The intermediate frequency, which is produced in the mixer stages 106 or 107, is represented by the symbol $f_0$ on Fig. 17, which shows the characteristic curve 114 of a filter-amplifier 116 or a filter-amplifier 117. The frequency $f_0$, it is to be understood, will be equal to the frequency $f_1$ selected by the filter 111 minus the carrier frequency $f$, or the carrier frequency $f$ minus the frequency $f_2$ selected by the filter 109. The slope 119 of the filter characteristic increases to its approximate 100% point at a frequency which is equal to the limit of the lower side band $f_3$ minus the carrier frequency $f$ and is indicated by the reference character 121 on Fig. 17. At a point 122 on the curve 114 the noise or deviation beat between the frequencies $f_1$ and $f$ will decrease. Also, at a point 123 the noise or deviation beat between the frequencies $f_2$ and $f$ will increase. These two effects will cancel, thereby eliminating the noise due to unwanted frequency or phase modulation of the incoming signal $f$.

The outputs from detectors 126 and 127 and amplifiers 128 and 129 respectively, if additional amplification is desirable or necessary, are combined by the connection 130 and the combined output is fed to a filter 131.

The curve 132 of Fig. 18 of the drawings shows the combined output of the detectors at 130. A portion 133 of this curve 132, it will be noted, is of double amplitude, and this portion of double amplitude covers a frequency band corresponding to the difference in frequency between the carrier frequency $f$ and the lower limit $f_3$ of the lower side band. More correctly speaking, this double amplitude portion of the curve is equal to the difference between the upper limit of the higher intermediate frequency side band and the intermediate frequency itself as will be understood by those skilled in the art.

The curve 134 of Fig. 19 represents the desired response characteristic of the filter 131, and it will be noted that this characteristic has a portion 136 which will provide approximately 50% attenuation of frequencies lying in the band represented by the portion 133 of curve 132 of Fig. 18. The characteristic 134 may be obtained, as was pointed out in connection with Fig. 1 of the drawings, by employing two separate filters or filter-amplifier combinations, or by designing the filter 131 to have the response characteristic shown.

Fig. 20 of the drawings illustrates a modification of the system disclosed in Fig. 15 in which a limiter 139 is added between the mixer 107a and the amplifier-filter 117a. The remaining equipment is the same as that of Fig. 15 except that a filter, similar to the filter 131, following the connection 129a, is not necessary and therefore it is omitted. The connection 129a leads to the final output connection indicated by reference character 142. It will be obvious from the foregoing description of the operation of the system disclosed by Fig. 15 that no amplitude correction will be required in the video circuit. When the system of Fig. 15 is to be employed when receiving a transmitted signal such as is shown in Fig. 21 of the drawings, the filter 131 will not be necessary since very little of the lower side band accompanying the signal carrier is transmitted as shown by Fig. 21.

It will be obvious from the foregoing that equipment assembled in accordance with the disclosure of Fig. 15 of the drawings may be provided with a limiter corresponding to the limiter 139 in Fig. 20, and, also, suitable switching equipment, so that the filter 131 may be switched out of the circuit when the limiter 139 is connected between the mixer 107 and the amplifier-filter 117. When a signal such as is shown in Fig. 2 is to be received, the filter 131 and the limiter may be switched out of the circuit.

Having now described the invention, what is claimed and is desired to be secured by Letters Patent is the following:

1. In a receiving system for electric waves, comprising amplifying means for selecting a desired signal modulated wave having randomly occurring frequency modulations, a branched circuit for translating a selected wave into signals free from the effects of said randomly occurring modulations, said signals being capable of causing operation of a reproducing device, one branch of said branched circuit comprising a limiter to limit the successive peaks of a selected wave to a substantially uniform value, detuned filtering means coupled to the output of said limiter, said filtering means serving to produce amplitude variations in accordance with said randomly occurring modulations, a wave detector connected to the output of said filter, another branch of said branched circuit including a second detuned filtering means for producing amplitude variations in accordance with said randomly occurring modulations proportional to the amplitude variations of said first-named detuned filtering means, a wave detector connected to the output of said second-named filtering means, and a common output connection from said first-named and said second-named wave detecting means, the effect of randomly occurring modulations being neutralized by combining the outputs of said wave detecting means in said common output connection in opposition.

2. In a receiving system for electric waves comprising means for selecting a desired signal modulated wave, a branched circuit for translating a selected wave into signals capable of causing operation of a reproducing device, one branch of said branched circuit comprising limiting means to limit the successive peaks of a selected wave to a substantially uniform value, filtering means having a sloping selectivity characteristic on which the carrier of a selected wave is to be located thereby to vary the amplitude of said limited carrier in accordance with frequency variations of said carrier, said filtering means being coupled to the output of said limiter, a wave detector connected to the output of said filter to detect and produce rectified amplitude variations representing said carrier frequency variations, another branch of said branched circuit including filtering means having a selectivity characteristic sloping in a direction opposite to the direction of slope of said first-named filtering means on which the carrier of said selected wave is also to be located, a wave detector connected to the output of said second-named filtering means to detect the signal modulations of said selected signal modulated wave, and a common output connection from said first-named and second-named wave detecting means, the effect of frequency variations of said selected signal modulated wave being neutralized by combining said amplitude variations derived from said first-named filtering means with said detected signal modulations in said common output connection.

3. In a wave receiving system having predetermined pass-band of frequencies and a response characteristic which slopes in the regions of the upper and lower cut-off frequencies of the pass-band and which is substantially uniform between the upper and lower cut-off frequencies, the method of obtaining substantially complete neutralization of unwanted frequency and/or phase modulations of an incoming amplitude modulated wave which includes the steps of selecting an incoming wave for amplification and detection, removing substantially all of the desired amplitude signal modulation from a portion of the selected wave, filtering said wave by filter having a sloping characteristic, said wave being within the region of slope of said filtering characteristic, detecting said limited and filtered wave to derive amplitude variations representing unwanted frequency modulations in the selected electric wave, filtering another portion of said selected wave by a filter having a sloping characteristic, the high frequency end of the slope corresponding with the low frequency region of the slope of said first-named filter, detecting said other portion of the selected wave, the resulting detected wave containing amplitude variations due to said unwanted frequency modulations, and combining the derived amplitude variations representing unwanted modulations with said resulting detected wave in opposition to thereby balance out the unwanted amplitude variations in the detected wave.

4. In a receiving system for electric waves comprising means for selecting a desired signal modulated wave having randomly occurring frequency modulations, a branched circuit, one branch of said branched circuit comprising means for limiting the wave to substantially constant amplitude and means to vary the amplitude of said wave in accordance with the randomly occurring frequency variations thereof, another branch of said branched circuit having means to vary the amplitude of said wave in accordance with the randomly occurring frequency variations thereof and effectively in the opposite sense to the previously named amplitude varying means, means for translating a selected wave into signals capable of causing operation of a reproducing device, and a connection from said first-named to said second-named branch for effecting neutralization of the effect of said randomly occurring frequency variations of said selected signal modulated wave.

THOMAS L. GOTTIER.